(12) United States Patent
Landon

(10) Patent No.: US 8,329,245 B2
(45) Date of Patent: Dec. 11, 2012

(54) METHOD OF FORMING A NON-FRACTIONATED, ROOM-TEMPERATURE POURABLE BUTTER

(75) Inventor: Todd Landon, Mound, MN (US)

(73) Assignee: Land O'Lakes, Inc., Arden Hills, MN (US)

( * ) Notice: Subject to any disclaimer, the term of this patent is extended or adjusted under 35 U.S.C. 154(b) by 170 days.

(21) Appl. No.: 12/533,716

(22) Filed: Jul. 31, 2009

(65) Prior Publication Data

US 2009/0291194 A1  Nov. 26, 2009

Related U.S. Application Data

(62) Division of application No. 11/894,545, filed on Aug. 21, 2007, which is a division of application No. 10/222,262, filed on Aug. 16, 2002, now Pat. No. 7,279,191.

(51) Int. Cl.
*A23C 15/00* (2006.01)

(52) U.S. Cl. ........ 426/664; 426/581; 426/603; 426/607; 426/613

(58) Field of Classification Search .......... 426/580, 426/581, 601, 602, 603, 607, 613, 664
See application file for complete search history.

(56) References Cited

U.S. PATENT DOCUMENTS

| | | | |
|---|---|---|---|
| 96,477 A | 11/1869 | Peck | |
| 139,796 A | 6/1873 | Kirchhoffer | |
| 253,820 A | 2/1882 | Kendall et al. | |
| 367,940 A | 8/1887 | Towar, Jr. | |
| 598,561 A | 2/1898 | Dubuisson | |
| 601,319 A | 3/1898 | Hargrave | |
| 726,065 A | 4/1903 | Iscovesco | |
| 823,803 A | 6/1906 | Monroe | |
| 847,563 A | 3/1907 | Fay et al. | |
| 1,060,633 A | 5/1913 | Roos | |
| 1,749,427 A | 3/1930 | Hoffman et al. | |
| 2,357,896 A | 9/1944 | Howe | |
| 2,395,051 A | 2/1946 | Horneman et al. | |
| 2,609,300 A | 9/1952 | Storrs et al. | |
| 2,612,454 A | 9/1952 | Bettman | |
| 3,519,435 A | 7/1970 | MacCollom | |
| 3,985,911 A | 10/1976 | Kriz et al. | |
| 4,005,228 A | 1/1977 | Norris | |
| 4,112,132 A | 9/1978 | Badertscher et al. | |
| 4,436,760 A | 3/1984 | Verhagen et al. | |
| 4,438,149 A | 3/1984 | Verhagen et al. | |
| 4,680,194 A | 7/1987 | Kilroy | |
| 4,769,255 A | 9/1988 | Ahmed et al. | |
| 4,959,239 A | 9/1990 | Ernsting et al. | |
| 4,961,950 A | 10/1990 | Ahmed et al. | |
| 4,970,087 A | 11/1990 | Admed et al. | |
| 4,978,553 A | 12/1990 | Silver | |
| 5,053,241 A | 10/1991 | Mongeau et al. | |
| 5,092,964 A | 3/1992 | Conte, Jr. et al. | |
| 5,096,732 A | 3/1992 | Mongeau et al. | |
| 5,118,522 A | 6/1992 | Vermaat et al. | |
| 5,158,797 A | 10/1992 | Studer et al. | |
| 6,333,059 B1 | 12/2001 | Monsalve et al. | |
| 6,416,801 B2 | 7/2002 | Beckett | |
| 6,468,578 B1 | 10/2002 | Bodor et al. | |
| 6,544,579 B1 | 4/2003 | Landon | |

FOREIGN PATENT DOCUMENTS

| | | |
|---|---|---|
| EP | 0198538 | 10/1986 |
| EP | 0347006 B1 | 12/1989 |
| EP | 0355964 | 2/1990 |
| EP | 0385541 B1 | 9/1990 |
| EP | 0448938 A1 | 10/1991 |
| EP | 1065937 B1 | 1/2001 |
| GB | 158175 A | 3/1921 |
| JP | 7264979 | 3/1994 |
| JP | 11075689 | 9/1999 |
| WO | 8804525 A1 | 6/1988 |
| WO | 891070 A | 11/1989 |
| WO | 0128348 A1 | 4/2001 |
| WO | 0128349 A1 | 4/2001 |

OTHER PUBLICATIONS

Belitz H.D., Grosch W.: "Food Chemistry (Chapter 21.3.3.2 Chocolate Production)" 1999, Springer-Verlag, Berlin, pp. 901-902; Table 21.21.

Kaylegian K.E. et al.,: "Performance of Selected Milk Fat Fractions in Cold-Spreadable Butter", Journal of Dairy Science, American Dairy Science Association, Champaign, Illinois, U.S., Vo. 75, No. 12, Dec. 1, 1992, pp. 3307-3319.

*Primary Examiner* — Leslie Wong

(74) *Attorney, Agent, or Firm* — Dorsey & Whitney LLP; Bridget M. Hayden, Esq.

(57) ABSTRACT

A method of forming a fat product, the method entailing heating a first material to a first temperature to form a first intermediate, the first material comprising fat and the first temperature adequate to remove any memory of crystallization from the fat; rapidly cooling the first intermediate to a second temperature to form a second intermediate, the second temperature adequate to provide nascent seed crystals in the second intermediate; and quiescently cooling the second intermediate to form the fat product, the quiescent cooling adequate to support growth of macro-crystals about the nascent seed crystals.

25 Claims, 6 Drawing Sheets

METHOD OF FORMING A NON-FRACTIONATED, ROOM-TEMPERATURE POURABLE BUTTER

CROSS-REFERENCE TO RELATED APPLICATION(S)

The present application is a divisional of and claims priority of U.S. patent application Ser. No. 11/894,545, filed Aug. 21, 2007, which is a divisional of Ser. No. 10/222,262, filed Aug. 16, 2002, now U.S. Pat. No. 7,279,191, the content of which is hereby incorporated by reference in its entirety.

BACKGROUND OF THE INVENTION

The present invention generally relates to a butter product and to a method of making the butter product. More particularly, the present invention relates to the butter product that has a particular crystalline structure, where the particular crystalline structure reforms upon melting and re-solidification of the butter product. Additionally, the present invention relates to the butter product with the particular structure where a stable and homogenous mixture of aqueous phase and fat phase components exists when the butter product is melted.

Butter preparation methods represent some of the oldest techniques for preserving fat components that are found in milk. Butter manufacture has been accomplished in one form or another for over 4500 years. Over the centuries, butter has been used in sacrificial worship ceremonies, for medicinal and cosmetic purposes, and as a human food.

Butter production techniques generally evolved into more sophisticated techniques as new forms and uses of equipment developed. For example, the barrel churn made its appearance toward the end of the 18th century when non-wooden manufacturing materials entered widespread use in creaming and butter-making equipment. These advances led to advances in cream separation techniques and, by 1879, continuous operation cream separators were known in Sweden, Denmark, and Germany. Likewise, butter production evolved from an individual farm activity to a factory-based technique with the introduction of milk pooling systems for creamery operation in the 1870s. Later advances in fat quantification techniques, pasteurization, refrigeration, and bacterial culture usage further advanced the art of butter production.

Food preparation plants now prepare a wide variety of food products that often incorporate butter. However, these plants are often unable to adequately handle the butter in preparation for incorporating the butter onto or into finished products. These plants typically melt the butter and thereafter transport the melted butter within the plant via a manifold system. Processes for heating and liquefying butter must be carefully controlled to avoid burning or browning components of the butter. These processes for heating and liquefying butter must be also carefully controlled in an effort to prevent separation of the fat and aqueous components of the melted butter.

Another difficulty often arises in these plants when inadequate temperature control over the long manifold runs sometimes present in these plants allows the melted butter to cool excessively and thereby solidify and plug the manifold runs. This solidification difficulty creates still more difficulties beyond the mere problem of unplugging the manifold runs. Specifically, food production lines that depend upon these manifold systems for supplying melted liquid butter will typically yield off-specification food products when plugged manifold lines disrupt the supply of melted butter to the production lines.

To circumvent this problem, butter substitutes are sometimes used in place of real melted butter. These butter substitutes frequently consist of vegetable oils that include artificial butter flavors. These butter substitutes are clearly inadequate for many food products, because the taste and texture of food products incorporating butter substitutes are typically different in taste, texture, and mouth-feel from food products made with real butter. Consumers generally prefer the taste, texture, and mouthfeel of food products that are made with real butter, as opposed to butter substitutes. Therefore, managers of food preparation plants want an approach that reliably allows real butter incorporation via food production lines.

However, such an approach must necessarily address the other issues noted above, such as the tendency for real butter to burn or brown during melting operations. Additionally, such an approach must necessarily maintain a homogenous mixture of the fat and aqueous phases during transportation of the melted butter and during incorporation of the melted butter into food products. Furthermore, such an approach should avoid the problems raised by long manifold runs and inadequate manifold temperature control sometimes present in these plants that allows the melted butter to sometimes solidify and plug the manifold runs. The novel butter product of the present invention achieves these various objectives and thereby provides food preparation plant managers with beneficial alternative approach to reliably incorporating real butter in food products via food production lines.

BRIEF SUMMARY OF THE INVENTION

The present invention includes a method of forming a fat product. According to the method, a first material is heated to a first temperature to form a first intermediate, where the first material include fat and the first temperature is adequate to remove any memory of crystallization from the fat. The first intermediate is rapidly cooled to a second temperature to form a second intermediate, where the second temperature is adequate to provide nascent seed crystals in the second intermediate. The second intermediate is quiescently cooled to form the fat product, where the quiescent cooling is adequate to support growth of macro-crystals about the nascent seed crystals. The present invention additionally includes a butter product and a method of forming the butter product.

DETAILED DESCRIPTION

The present invention generally relates to a fat product, such as a butter product, and to a method of making the fat product. More particularly, the present invention relates to the butter product that has a particular crystalline structure, where the particular crystalline structure reforms upon melting and re-solidification of the butter product. Additionally, the present invention relates to the butter product with the particular structure where a stable and homogenous mixture of aqueous phase and fat phase components exists when the butter product is melted.

Figure 1:
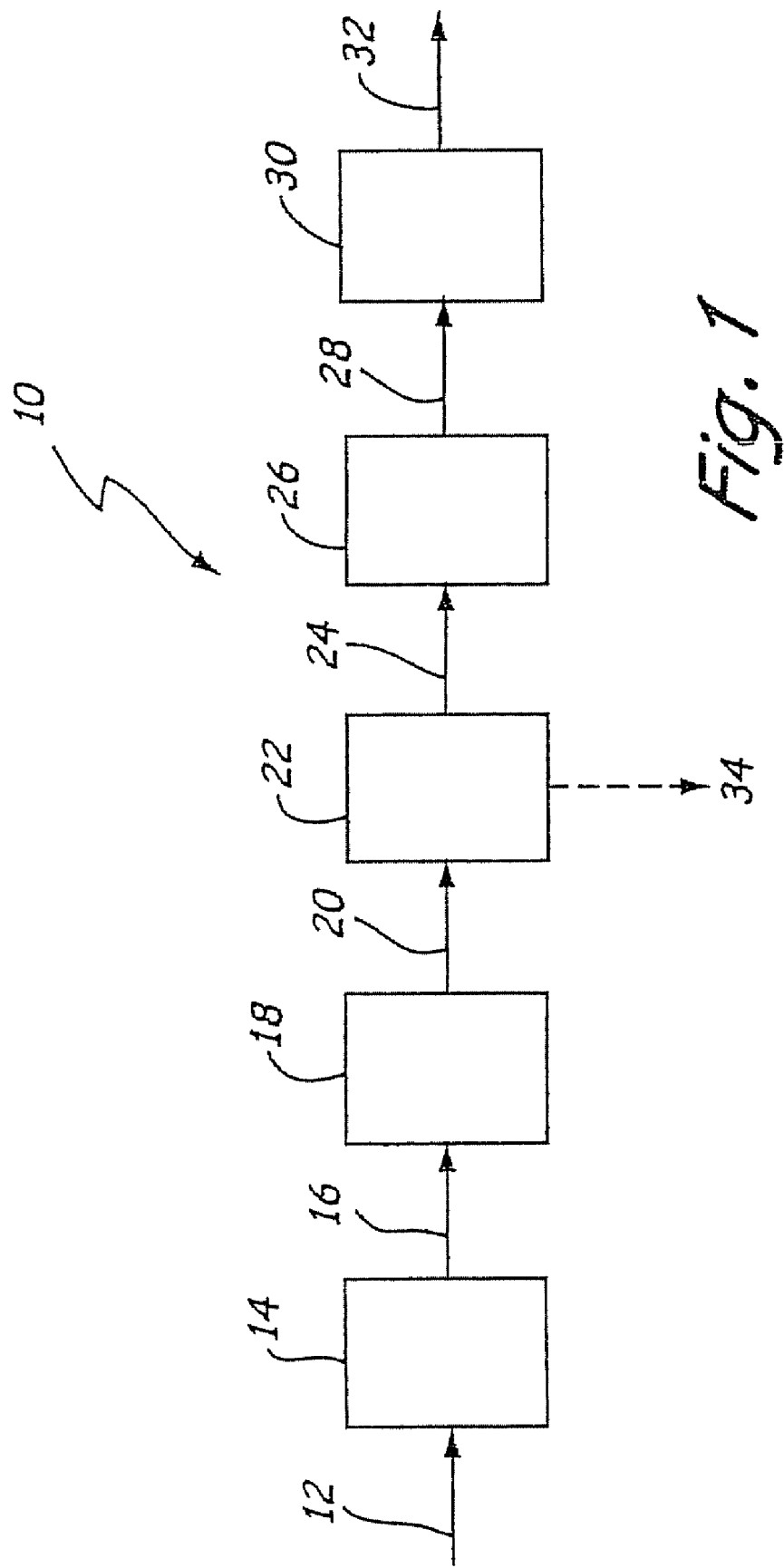
FIG. 1 is a schematic of a process for producing a butter product in accordance with the present invention.

Briefly, the present invention may be practiced using a process 10, as depicted in FIG. 1. In the process 10, a feed material 12 that comprises a fat phase(s) and an aqueous phase(s) is heated in a vessel 14 sufficiently to melt the fat phase(s), preferably remove any crystallization memory of the fat phase(s) and form a heated feed material 16. The heated feed material 16 is rapidly cooled in a first cooling apparatus 18 to a first temperature to initiate formation of fat crystal nuclei in the fat phase(s) and form an intermediate material 20. The intermediate material 20 is then transferred to a second cooling apparatus 22, such as a vessel, to allow undisturbed, slow cooling of the intermediate material 22. This undisturbed, slow cooling in the second cooling apparatus has surprisingly been found effective to initiate and support growth of macro fat crystals about the fat crystal nuclei previously formed in the fat phase. The slow cooling is allowed to continue until the contents of the second cooling apparatus reach a second temperature that is somewhat lower than the first temperature. This second temperature is selected to allow a desired degree of macro-fat crystal formation in the fat phase.

After the second temperature has been attained, the contents of the second cooling apparatus (i.e. the fat phase(s) and the aqueous phase(s)) are homogeneously blended together to form a cooled, homogeneous mixture, namely a fat product 24, such as a butter product. The fat product 24 may then be homogenized in a homogenizer 26 to form a modified fat product 28. Alternatively, the fat product 24 may be processed in the homogenizer 26 and thereafter worked while being further cooled, such as in conventional butter and margarine processing equipment. As yet another alternative, the fat product 24 may be blended in any desired ratio with butter using blending equipment 30 to form a modified fat product 32, where the butter is at approximately room temperature during blending with the modified fat product 26. Additionally, the fat product 24 may be homogenized prior to blending with the butter.

Throughout the drawings, like elements are referred to using like reference characters.

In the process 10, the feed material 12 that is placed in the vessel 14 includes at least one fat phase and at least one aqueous phase. The vessel 14 that accepts the feed material 12 is preferably jacketed to support heating of the feed material 12 in the vessel 14. Alternatively, the feed material 12 may be heated prior to entering the vessel 14, such as in a first tube-in-shell type heat exchanger (not shown), to melt fat(s) present in the feed material 12.

No matter how the heating is accomplished, the fat(s) of the feed material 12 is preferably heated sufficiently to (1) completely melt the fat(s), (2) remove any memory of crystallization originally present in the fat(s), and (3) support full and homogeneous dispersal of the fat(s) within the feed material 12 that is held in the vessel 14. In pursuit of this goal, fat phase(s) of the feed material 12 is preferably heated to a temperature of at least about 140° F., or more, and more preferably at least about 155° F., or more. Typically, to accomplish the heating of the fat(s), the feed material 12 itself will be heated to about the same temperature as the fat(s). The feed material 12, after the fat(s) have been heated in this fashion in the vessel 14, is transformed into the heated feed material 16.

During and/or after heating of the fat(s), the heated feed material 16 is preferably homogeneously mixed within the vessel 14. This mixing is preferably adequate to homogeneously blend the fat phase(s) and the aqueous phase(s) in the heated feed material 16. This homogeneous mixing is desirable for at least a couple of reasons. First, this homogeneous mixing of the fat phase(s) and the aqueous phase(s) helps prevent any localized concentration of the fat phase(s) that could hinder subsequent cooling of the heated feed material 16 by virtue of solidification of fat(s) in cooling equipment. Additionally, homogeneous dispersal of the fat phase(s) in the heated feed material 16 provides the heated material 16 with an enhanced lubricity that facilitates a more uniform cooling rate throughout the heated feed material 16 during subsequent cooling of the heated feed material 16.

Preferably, heating of fat(s) of the feed material 12 to form the heated feed material 16 is sufficient to liquify all fat crystalline structures and all fat crystal nuclei within the feed material 12 and cause all fat crystalline structures and fat crystal nuclei within the feed material 12 to lose any crystalline memory. This loss of all crystalline memory by all fat crystalline structures and fat crystal nuclei of all fat(s) present in the feed material 12 helps minimize, and preferably eliminate, any premature fat crystal formation, before fat crystal formation is desired, during subsequent processing of the heated feed material 16 and duratives of the heated feed material 16.

To support homogeneous mixing of the fat phase(s) and the aqueous phase(s) in the heated feed material 16, the vessel 14 preferably includes a center post agitator (not shown) with agitation enhancement baffles (not shown) that are attached to the interior wall of the vessel 14. Nonetheless, any conventional agitation mechanism may be employed in the vessel 14, so long as mixing that is adequate to ensure homogeneous dispersal of all substances present in the vessel 14 is accomplished. The vessel 14 preferably has a slanted, cone-shaped bottom (not shown) to permit complete emptying of the vessel 14. One suitable example of the vessel 14 is the WPDA (600 gallon/2271 liter capacity) process tank that is available from Waukesha Cherry-Burrell of Delavan, Wis.

In the process 10, the feed material 12 may generally may be, or may include, any butter. As used herein, all references to "butter", standing alone, are to be understood as referring to a dairy product prepared by churning, or equivalently processing, milk and/or cream, though other optional ingredients beyond milk and/or cream may be included during the butter production. Likewise, all references to the phrase "butter product" are to be understood as referring to a product that is derived, at least in part, from butter. The churning or equivalent processing used to prepare the butter may be accomplished in either batch-wise or continuous fashion. The source of the milk and/or cream that is used to form the butter may be bovine, ovine, caprine, or the like. Furthermore, the butter that makes up some or all of the feed material 12, may generally take any form, such as semi-solid, pumpable butter that exits the churning process; chilled solid butter; or butter that has been melted to form liquid butter.

Non-dairy ingredients, preferably minor non-dairy ingredients such as salt, a coloring agent, and/or vitamins, may optionally be included in the milk and/or cream that is churned to form the butter or may optionally be added to the milk and/or cream during the churning process. Also, non-dairy fat may optionally be added to the milk and/or cream that is processed to form the butter or may be added to the milk and/or cream during the butter production process.

Nonetheless, non-dairy fat is preferably not added to the milk and/or cream, either before or during processing of milk and/or cream to form the butter, since some of any such added non-dairy fat would likely be present in the buttermilk by-product of the butter forming process and would reduce the value of the by-product buttermilk. Also, non-dairy fat is preferably not added to the milk and/or cream either before or during processing of the milk and/or cream to form the butter, since any such addition of non-dairy fat would prevent the butter being formed from being labeled as butter, and would prevent products produced in accordance with the present invention from being labeled as butter-based products, under the present dietary labeling standards of United States regularity authorities, such as the U.S. Department of Agriculture (U.S.D.A.).

The feed material 12 preferably contains, and more preferably consists only of, butter that is recognized as butter in the United States by regularity authorities, such as the U.S. Department of Agriculture. The U.S.D.A. defines butter as follows:

The food product usually known as butter, and which is made exclusively from milk or cream, or both, with or without additional coloring matter, and containing not less than 80 percent by weight of milkfat, all tolerances having been allowed for.

7C.F.R. §58.305(a); revised Jan. 1, 1997. Generally, however, the feed material 12 may contain or may consist of any butter, such as butter formed by churning. This means that butter present in the feed material 12 will typically have a butter concentration of at least about 60 weight percent based on the total weight of the butter leaving the butter production process, since aggregation of milk fat molecules into the "butterfat" matrix that entraps water molecules will typically not form if the milk fat concentration of the in-process dairy material that is transformed into butter is less than about 60 weight percent, based on the total weight of the in-process dairy material.

For purposes of marketing products produced in accordance with the present invention to American consumers, the butter that forms, or is part of, the feed material 12 is preferably based upon dairy material that is produced by, or derived from, dairy cattle in the United States, since the palates of American consumers are accustomed to dairy material that is produced by or is derived from dairy cattle in the United States. Dairy cattle in other regions of the world are often fed or grazed upon different feeds than dairy cattle in the United States. For example, dairy cattle in New Zealand are typically grazed on clover which gives butter a unique flavor not typically appreciated by American consumers. Nonetheless, for purposes of marketing products produced in accordance with the present invention to consumers in countries other than the United States, the butter that forms, or is part of the feed material 12 may be based upon dairy material that is produced by, or is derived from, dairy cattle in countries other than the United States, while realizing that consumers in a particular country will typically prefer dairy products based upon dairy material produced by, or derived from, dairy cattle in that particular country.

The time between formation of the butter and introduction of the butter into the process 10 as the feed material 12, or as a component of the feed material 12, is preferably minimized to maximize the "fresh churned" butter taste of products produced in accordance with the present invention. Though not wishing to be bound by theory, it is believed that air entrained in butter during the churning process causes or contributes to degradation of flavor components in freshly-churned butter that are responsible for the difference between the taste of freshly churned butter and the taste of butter that may no longer be considered fresh churned.

Therefore, the butter that forms, or is part of, the feed material 12 is preferably freshly churned butter that has been produced no more than about 8 hours prior to being incorporated in the process 10. In one particularly preferred embodiment, the butter that forms, or is part of, the feed material 12 is introduced into the process 10 in semi-solid form directly from the churning process to minimize the time between formation of the butter and feeding of the butter to process 10 as the feed material 12 or as a component of the feed material 12.

Continuing with the process 10, the heated feed material 16, after leaving the vessel 14, is directed to the first cooling apparatus 18. The first cooling apparatus 18 reduces the temperature of the heated feed material 16 to the first temperature and thereby transforms the heated feed material 16 into the intermediate material 20. The heated feed material 16 may be transferred to the first cooling apparatus 18 in any conventional fashion, such as pumping. For example, the heated feed material 16 may be transferred to the first cooling apparatus 18 using a positive displacement pump, such as a Moyno® positive displacement pump that is available from Moyno, Inc., of Springfield, Ohio.

In the first cooling apparatus 18, the heated feed material 16 is rapidly cooled to a target crystal nucleation point that is represented by the first temperature. The first temperature (i.e. the target crystal nucleation point) may generally range from about 82° F. to about 96° F. Preferably, the first temperature ranges from about 92° F. to about 96° F., since selection of the first temperature within this preferred temperature range has been found to yield products produced in accordance with the present invention that have a better, more pourable form at room temperatures, such as temperatures of about 72° F.

The first cooling apparatus 18 may generally be any cooling equipment that is amenable to rapidly cooling the heated feed material 16 to the first temperature. For example, the first cooling apparatus 18 may be a Model FP25B scraped surface heat exchanger that is available from Armfield Limited of Ringwood, England, for lower volume operations. For higher volume operations, the Votator® series of scraped surface heat exchangers, such as the Votator® model 10312F scraped surface heat exchanger, that are available from Waukesha Cherry-Burrell of Delavan, Wis. are suitable examples of the first cooling apparatus 18. In one particular embodiment of the present invention, the first cooling apparatus 18 was a pair of the Votator® model 10312 F heat exchangers that may be arranged in series, with only the first of these two heat exchangers employing a coolant for cooling the heated feed material 16. In this arrangement, the second heat exchanger of the two series—oriented swept surface heat exchangers may be employed merely for purposes of further working the material that exists the first of the two swept surface heat exchangers.

As noted, the first cooling apparatus 18 preferably cools the heated feed material 16 rapidly from the temperature of the heated feed material 16 upon entering the first cooling apparatus 18 to the first temperature that represents the target fat crystal nucleation point. Preferably, the first cooling apparatus 18 causes the heated feed material 16 to be cooled to the first temperature within about 60 seconds, or less, after the heated feed material 16 enters the first cooling apparatus 18. More preferably, the first cooling apparatus 18 is effective to attain the first temperature within about 30 seconds, or less, after the heated feed material 16 enters the first cooling apparatus 18.

In the first cooling apparatus 18, the rapid cooling helps initiate fat crystal development as the heated feed material 16 cools. However, the first temperature is set to only begin development of fat crystals (nascent crystal formation) and/or development of fat crystal nuclei that serve as nascent seed crystals sufficient to support further fat crystal growth and fat crystalline structure development later in the process 10.

The rapid cooling to the first temperature, in combination with the first temperature in the range of about 82° F. to about 96° F., is believed to favor transient formation of alpha fat crystal nuclei and alpha fat crystal structures in the intermediate material 20. The formation of alpha fat crystal nuclei and alpha fat crystal structures is characterized as "transient" because it is believed the alpha forms of the fat crystal nuclei and fat crystal structures only exist for a short period of time and thereafter change to beta prime (β') fat crystal nuclei and beta prime (β') fat crystal structures. Additionally, cooling of the heated feed material 16 is preferably accomplished under agitation conditions that favor transient formation of alpha fat crystal nuclei and alpha fat crystal structures in the intermediate material 20. Consequently, any swept surface heat exchangers that are employed as the first cooling apparatus 18 is preferably operated at a relatively low rate, such as at a scroll or dasher speed of about 150 to about 300 revolutions per minute to favor transient formation of alpha fat crystal nuclei and alpha fat crystal structures in the intermediate material 20.

Transient formation of alpha fat crystal nuclei and alpha fat crystal structures in the intermediate material 20 is preferred, since transient alpha fat crystal nuclei and transient alpha fat crystal structures are thought to enhance the phase stability of products produced in accordance with the present invention, especially at room temperatures of about 72° F. and higher. Transient alpha fat crystal nuclei and transient alpha fat crystal structures are believed to help achieve this stability by helping enhance the ratio of (1) the volume of the dispersed aqueous phase to (2) the surface area of the dispersed aqueous phase in emulsions or dispersions present in products that are produced in accordance with the present invention. Essentially, the transient existence of the preferred alpha fat crystal nuclei and alpha fat crystal structures is thought to support entrapment of small droplets of dispersed aqueous phase within the continuous fat phase which thereafter helps minimize, or even eliminate, coalescence of different small droplets of the dispersed aqueous phase with each other in the intermediate material 20 and in subsequent derivatives of the intermediate material 20.

After the heated feed material 16 is cooled to the first temperature in the first cooling apparatus 18, the intermediate material 20 is thereafter cooled to a second temperature in the second cooling apparatus 22. The cooling that is effected in the second cooling apparatus 22 is effective to transform the intermediate material 20 into the fat product 24. In the second cooling apparatus 22, the intermediate material 20 is allowed to slowly cool under quiescent conditions for a cooling period that is long enough to support growth of macro-fat crystals about the nascent seed crystals present in the intermediate material 20.

The second temperature is somewhat lower than the first temperature and is preferably at least about 8° F. lower than the first temperature. The second temperature may, for example, range from about 72° F. to about 84° F. Preferably, however, the second temperature ranges from about 74° F. to about 76° F. to provide conditions that help enhance growth of macro-fat crystals. Generally, the quiescent cooling in the second cooling apparatus 20 may be several hours or longer, though the quiescent cooling period is preferably at least about 12 hours in duration, such as about 12 hours to about 48 hours long, or even longer. More preferably, the quiescent cooling period is at least 18 hours long, such as about 18 hours to about 48 hours, or more, since longer duration cooling at slower cooling rates supports enhanced development of desirable macro-fat crystals. The quiescent cooling conditions in the second cooling apparatus 22 are preferably sufficient to allow macro-fat crystal development in the predominant absence of any agitation or mixing, more preferably in the essential absence of any agitation or mixing, and most preferably in the complete absence of any agitation or mixing, by allowing the intermediate material 20 to be at least predominantly at rest, more preferably essentially at rest, and most preferably completely at rest, with predominantly no, preferably essentially no, and most preferably no mechanically induced mixing.

After the intermediate material 20 has reached the second temperature in the second cooling apparatus 22, the material consequently remaining in the second cooling apparatus 22 is blended to provide a homogeneous mixture of the crystal structures then present. Generally, this blending will result in homogeneous dispersal of aqueous phase and fat phase components together. Typically, it has been found that the macro-fat crystals formed in the second cooling apparatus have a fairly large size and a grainy texture/appearance.

In one form, the second cooling apparatus 22 may merely be a vessel, such as a tank, that includes agitation equipment for providing the described homogeneous blending following cooling to the second temperature. For example, the second cooling apparatus 22 may be the same as, or similar to, the vessel 14, though the second cooling apparatus 22 does not necessarily need to be jacketed. Indeed, the cooling source for the second cooling apparatus 22 may generally entail the atmosphere that is distributed about the second cooling apparatus 22, where the ambient atmosphere is generally at a third temperature that is near, or slightly below, the second temperature. Nonetheless, the second cooling apparatus may be jacketed and include a cooling medium, and more preferably a temperature controlled cooling medium, to support active cooling of the heating of the feed material 12 in the second cooling apparatus 22.

As an example when the second cooling apparatus 22 is not jacketed, the third temperature of the ambient air (cooling medium about the second cooling apparatus 22) may generally range from about 70° F. to about 80° F., but preferably ranges from about 70° F. to about 74° F. Of course, whatever third temperature is selected, the third temperature must always be below the temperature then present in the material being cooled in the second cooling apparatus 22, to in fact support a positive cooling rate. However, it is permissible for the third temperature to initially be above the second temperature during cooling of the intermediate material 20 in the second cooling apparatus 22, though the third temperature will necessarily be below the second temperature as the cooling period advances, to allow attainment of the second temperature.

As an alternative example when the second cooling apparatus 22 is jacketed, the temperature of the cooling medium in the jacketing of the second cooling apparatus 22 may generally range from about 70° F. to about 80° F., but preferably ranges from about 70° F. to about 74° F. Of course, whatever temperature is selected for the cooling medium in the jacketing of the second cooling apparatus 22, this jacketed cooling medium temperature must always be below the temperature then present in the material being cooled in the second cooling apparatus 22, to in fact support a positive cooling rate. However, it is permissible for the jacketed cooling medium temperature to initially be above the second temperature during cooling of the intermediate material 20 in the second cooling apparatus 22, though the jacketed cooling medium temperature will necessarily be below the second temperature as the cooling period advances, to allow attainment of the second temperature.

As one suitable example, the second cooling apparatus may be the WPDA (600 gallon/2271 liter capacity) process tank described above as an example of the vessel 14. However, to allow attainment of the second temperature within a quiescent cooling period that does not extend beyond about 48 hours, any vessel that is selected for use as the second cooling apparatus 22 should preferably have a surface area to volume (capacity) ratio that alleviates the need for the quiescent cooling period extending beyond about 48 hours.

After the material in the second cooling apparatus 22 has attained the second temperature during the quiescent cooling period, the agitation equipment that may be provided in the second cooling apparatus 22 is activated to homogeneously blend the material then present in the second cooling apparatus 22 and complete transformation of the intermediate material 20 into the fat product 24. As an alternative, it is acceptable to remove the material with the developed macro-fat crystal profile from the second cooling apparatus 22 for subsequent homogeneous mixing outside of the second cooling apparatus 22. Nonetheless, the agitation is preferably conducted within the second cooling apparatus 22 to help ensure homogeneous mixture of the fat phase(s) and the aqueous phase(s).

After the homogeneous mixing has occurred and the fat product 24 has been formed, the fat product 24, which may take the form of the butter product, may be further processed or blended with other components to modify the fat crystal profile and properties of the fat product 24. In one preferred embodiment of the present invention, the fat product 24 is the butter product, or the butter product that is based upon the feed material that consists only of butter.

As produced, the fat product 24, such as the butter product, has surprisingly been found to have a consistency that is either about the same as, or softer than butter at typical refrigeration temperatures ranging from about 35° F. to about 40° F., while having a consistency at temperatures warmer than refrigeration temperatures, such as temperatures in the range about 50° F. to about 75° F., that is definitely softer than the consistency of butter at those relatively warm temperatures. Still more surprisingly, at relatively high temperatures on the order of about 68° F. to about 75° F., the consistency of the fat product 24, such as the butter product, is significantly softer than the consistency of butter at these elevated temperatures. In fact, at these temperatures, the fat product 24, such as the butter product, has a pourable consistency. Indeed, at a temperature of about 72° F., the fat product 24, such as the butter product, has been found to have a Brookfield viscosity that ranges from about 1,000 centipoise to about 55,000 centipoise, depending upon the first temperature that is selected during operation of the first cooling apparatus 18. On the other hand, at a temperature of about 72° F., butter has a significantly higher Brookfield viscosity than the fat product 24 of the present invention and is not a pourable substance.

Furthermore, it has been surprisingly found that the fat product 24, such as the butter product, may be repeatedly cycled from an elevated temperature, such as the temperature of about 72° F., to a refrigeration temperature such as a temperature of about 37° F., and then back to an elevated temperature, such as a temperature of at least about 72° F., multiple times, while still remaining pourable at the elevated temperature, such as about 72° F. Generally, the temperature of the fat product 24 is capable of being cycled from the elevated temperature conditions, to refrigeration temperature and then back to the elevated temperature at least twice, while remaining pourable. Preferably, the fat product 24, such as the butter product, is capable of being cycled at least ten times, and more preferably at least twenty-five, from the elevated temperature to the refrigeration temperature, and then back to the elevated temperature, while still remaining pourable at elevated temperature, such as at about 72° F.

Additionally, the fat product 24, such as the butter product, has been found to remain homogeneous without any oil separation, at elevated temperatures that range from about 72° F. to about 92° F., after being cycled from the elevated temperature ranging from about 72° F. to about 92° F. down to refrigeration temperature, such as about 37° F., and back to the elevated fat product temperature in the range of about 72° F. to about 92° F., at least two times. Preferably, the fat product 24, such as the butter product, remains homogeneous without any oil separation, at elevated temperatures that range from about 72° F. to about 92° F., after being cycled from the elevated temperature ranging from about 72° F. to about 92° F. down to refrigeration temperature, such as about 37° F., and back to the elevated fat product temperature in the range of about 72° F. to about 92° F., at least ten (10) times. More preferably, the fat product 24, such as the butter product, remains homogeneous without any oil separation, at elevated temperatures that range from about 72° F. to about 92° F., after being cycled from the elevated temperature ranging from about 72° F. to about 92° F. down to refrigeration temperature, such as about 37° F., and back to the elevated fat product temperature in the range of about 72° F. to about 92° F., at least twenty-five (25) times, while remaining homogeneous and without fat separation upon attaining the elevated temperature ranging from about 72° F. to about 92° F.

As noted, the fat product 24 may be further processed to provide a variety of different desired characteristics. For example, the fat product 24 may be homogenized in the homogenizer 26 to provide the modified fat 28. Homogenization of the fat product 24 is preferably done while minimizing or avoiding a temperature rise during the homogenization to avoid melting fat during the homogenization that may undesirably alter the fat crystal profile and the modified fat product 28. The homogenization does entail modification of the fat crystal profile in the modified fat product 28 versus the fat crystal profile in the fat product 24, since the homogenization causes crystal shearing and crystal size reduction. Generally the fat crystal modification during homogenization causes the modified fat product 28 to have a smoother texture and a fat crystal profile with generally smaller sized fat crystals. For example, a particular embodiment of the fat product 24 may have a large fraction of macro-fat crystals with a diameter on the order of about 90 microns while the modified fat product 28, following homogenization of the fat product 24, may have a large concentration of fat crystals with diameters in the range of about 10 microns to about 20 microns.

Additionally, the homogenizer 26 generally helps enhance the stability of the aqueous phase and the fat phase within the modified fat product 28 by providing small discrete aqueous phase droplets with diameters on the order of about 1 micron to about 2 microns. Thus, homogenization forms the modified fat product 28 and thereby helps further disperse the aqueous phase within the fat phase of the modified fat product 28, versus dispersal of the aqueous phase in the fat phase in the fat product 24, while also minimally reducing the aqueous phase droplet size range. Reducing the aqueous droplet size range in the modified fat product 28, versus the aqueous phase droplet size in the fat product 24, will generally tend to enhance aqueous phase stability within the continuous fat phase of the modified fat product 28.

Furthermore, the decreased fat crystal profile size in the modified fat product 28 due to homogenization of the fat product 24 generally provides the modified fat product 28 with a smoother, less grainy texture and appearance, along with a more pleasing mouth feel, as compared to the texture, appearance, and mouthfeel of the fat product 24. On the other hand, homogenization of the fat product 24 to form the modified fat product 28 may provide the modified fat product 28 with a slightly more viscous consistency, as compared to the consistency of the fat product 24. Therefore, the degree of homogenization and the decision to homogenize the fat product 24 should take into account desired properties of the end product such as the viscosity characteristics, the texture and appearance characteristics, and the mouth feel characteristics for the end product.

As yet another alternative, the modified fat product 28 that has been homogenized may be combined with butter, such as at a ratio of about 50 weight percent of the modified fat product 28 and about 50 weight percent of the butter, and blending equipment 30 to form a modified fat product 32. Some exemplary forms of blending equipment 30 include conventional butter and margarine blending equipment, such as a variety of different dynamic mixers or a swept heat exchanger, where the swept heat exchanger may be operated in either a cooling mode with mixing or in a mixing mode without any cooling or with only efficient cooling to prevent a temperature rise between the inlet and the outlet of the swept heat exchanger.

And still other alternatives, after attaining the second temperature in the second cooling apparatus 22, the material in the second cooling apparatus 22 may optionally be removed as a fat product 34 that is substituted in place of the fat product 24 in the process 10. The optional nature of the fat product 34 is depicted using dash lines in FIG. 1. Furthermore, beyond substituting the alternative fat product 34 for the fat product 24, the alternative fat product 34 may be blended directly with butter in the blending equipment 30, while bypassing the homogenizer 26. The product produced by this approach tends to have a consistency, when the butter and the alternative fat product 34 are blended in a 50/50 ratio, that is about the same as, or slightly softer than, the consistency of the fat product 24, the consistency of the modified fat product 28, and the consistency of the modified fat product 32, at refrigeration temperature in the range about of 35° F. to about 40° F., while having a more viscous consistency than the fat product 24, the modified fat product 28, and the modified fat product 32 at elevated temperatures, such as the temperature of about 68° F.

The foregoing comments detail a variety of different approaches that may be taken following the second cooling apparatus 22 in the process 10 to tailor a grouping of characteristics that are desired for particular applications of products of the present invention. Generally, the products of the present invention allow increased flexibility for end users, particularly commercial users, of products of the present invention. For example, a bakery or larger scale food production plant may beneficially employ butter products of the present invention that have the same, or essentially the same, composition as butter in their food products while still claiming that U.D.S.A. recognized real butter is present in their products.

Furthermore, the bakeries and larger scale food production plants may harness the flexible combination of properties achievable by virtue of the present invention to simplify use of real butter (as one of the butter products of the present invention) in their operations. For example, a food production plant may place a drum, such as a 55 gallon drum, of one of the butter products produced in accordance with the present invention adjacent to the food production line during the time of food production. By virtue of the beneficial stability characteristics and the fluid consistency characteristics at elevated temperatures, such as temperatures in the range of about 68° F. to about 92° F., the butter product of the present invention may be pumped directly to the production line for use, while not worrying about aqueous phase and fat phase separation or about line plugage.

Then, when the production line is no longer in use or the butter product is no longer needed, the drum of the butter product may be placed in refrigerated storage, without fear of the stability and fluid characteristics of the butter product at elevated temperatures being diminished upon removal from refrigerated storage for subsequent use, even after many cycles of elevated temperatures, followed by refrigeration, followed by subsequent use at elevated temperatures. This is indeed a surprising and beneficial combination of properties that may be achieved by the present invention, considering that butter not processed in accordance with the present invention is unable to achieve these beneficial properties and in fact generally is somewhat problematic for commercial baking and food production lines, at least standing alone.

Property Determination and Characterization Techniques

Various analytical techniques are employed herein. An explanation of these techniques follows. All values presented in this document for a particular parameter, such as viscosity, are based on the "as is" sample and are therefore on a "wet basis", unless otherwise specified herein.

Viscosity Determinations

Unless otherwise indicated, all viscosities recited herein may be determined in accordance with the following procedure that uses a Model RVF viscometer coupled with a Helipath™ Model D stand. The Model RVF viscometer and the Helipath™ Model D stand are each available from Brookfield Engineering Laboratories of Middleboro, Mass. Viscosity determinations provided herein were made in accordance with the operating manual supplied with the Model RVF viscometer and the Helipath™ Model D stand by Brookfield Engineering Laboratories, unless otherwise indicated herein.

The Brookfield viscosity of a particular sample may generally be determined by placing an appropriate amount of the sample in a beaker that is positioned within the viscosity measurement cell of the viscometer. The beaker should have a diameter that is sufficient to prevent development of any wall effects that could affect, at least by more than a de minimis degree, the viscosities determined by this procedure. The temperature of the sample may be taken immediately after placement of the sample in the beaker and subsequently recorded. The viscosity determination should be made quickly to minimize, and preferably eliminate, or essentially eliminate, any change in the temperature of the sample following placement of the sample in the beaker.

A spindle is positioned in the cell immediately after the sample has been placed in the viscosity measurement cell. The spindle, identified by a spindle designation, is selected so that the measured Brookfield viscosity is within the measurement range of the spindle. RV spindle # 4 that is available from Brookfield Engineering Laboratories, is used as the spindle for determining Brookfield viscosities herein, unless otherwise indicated. The spindle may generally be rotated at a rate ranging from about 2 to about 10 revolutions per minute in the viscosity measurement cell during viscosity determinations. However, during viscosity determinations made herein in accordance with this viscosity determination procedure, the selected spindle was rotated at a rate of about ten (10) revolutions per minute during viscosity determinations, unless otherwise indicated herein.

As noted above, the Helipath™ Model D stand is employed along with the Model RVF viscometer in this viscosity determination procedure. The Helipath™ Model D stand is a special stand that slowly raises and lowers the viscometer while the selected spindle rotates in the sample material. The spindle thus continuously cuts into fresh material and describes a helical path through the sample as the spindle rotates. This helical path is beneficial to prevent any tendency for decreasing viscosity readings during viscosity measurement of a particular sample. This tendency for decreasing viscosity readings sometimes arises when the rotating spindle is continuously held at the same depth in the sample, since the rotating spindle may sometimes tend to push the sample material aside, a consequent buildup of the sample material along the beaker wall, and a consequent reduction of material proximate the rotating spindle. Thus, the Helipath™ Model D stand avoids this potential problem by moving the changing the height of the spindle along a helical path, rather than continuously holding the spindle at the same depth in the sample.

Penetrometer Determinations

Unless otherwise indicated herein, all penetration determinations viscosities recited herein may be determined using a Model 6-9 Precision Universal Penetrometer that is available from Precision Scientific Company of Chicago, Ill. Penetrometer determinations provided herein were made in accordance with the operating manual supplied with the Model 6-9 Precision Universal Penetrometer by Precision Scientific Company, unless otherwise indicated herein. A standard ASTM (American Society for Testing and Materials, Conshohocken, Pa.) 45 gram cone was employed for all penetration determinations, without any added weight beyond the weight of the cone, unless otherwise indicated herein. The duration of the cone drop during penetrometer determinations using this procedure was six seconds, unless otherwise indicated. Penetrometer results are presented herein as X mm/10/6 seconds, which means that during a cone drop duration of six seconds, the cone penetrated X tenths of a millimeter into the material being tested, where X is the numeric measured value.

EXAMPLES

The present invention is more particularly described in the following Examples that are intended as illustrations only since numerous modifications and variations within the scope of the present invention will be apparent to those skilled in the art.

Example 1

This example illustrates a method of making a fat product in accordance with the present invention along with various methods for making modified fat products in accordance with the present invention. The feed material that was employed in this example was one pound of conventional, printed, salted, butter that was obtained from Land O' Lakes, Inc., of Arden Hills, Minn. The butter that was used as a feed material was melted in a double boiler apparatus.

In the double boiler apparatus, a stainless steel beaker was supported in the double boiler to prevent the bottom of the stainless steel beaker from coming into direct contact with the bottom of the double boiler. Water was placed in the double boiler apparatus to surround the stainless steel beaker. The water in the double boiler apparatus was boiled to melt the butter contained in the stainless steel beaker. The butter in the stainless steel beaker was heated to a temperature of approximately 150° F. using the double boiler apparatus to remove any memory of crystallization from the fat components of the butter.

Next, the stainless steel beaker containing the melted butter was placed on a hot pad. The hot pad was set to control the melted butter at a minimum temperature of about 125° F. A Type RZRI lab mixer equipped with a three blade agitator was positioned with the three blade agitator in the melted butter. The Type RZRI lab mixer equipped with the three blade agitator may be obtained from Caframo, Ltd. of Wiarton, Ontario, Canada. The Caframo lab mixer was set to operate the agitator at about 1,000 revolutions per minute (rpm) to blend the melted butter. This blending of the melted butter was undertaken to uniformly blend the fat phase with the aqueous phase and thereby help prevent any localized concentration of the aqueous phase or fat phase that might reduce the lubricity of the melted butter or cause localized, non-uniform cooling that could lead to localized freezing of the melted butter during subsequent swept surface heat exchanger processing.

After the melted butter was uniformly blended, the melted butter was transferred using a positive displacement pump through the swept surface heat exchanger. The swept surface heat exchanger employed in this example was a Model FT25B scraped surface heat exchanger that is available from Armfield Limited of Ringwood, England. The positive displacement pump transferred the melted butter to the Armfield swept surface heat exchanger at a rate ranging from 31.28 grams of the melted butter per 10 seconds to 34.58 grams of the melted butter per 10 seconds. The dasher of the Armfield swept surface heat exchanger was set to rotate at about 250 rpm, and the coolant circulating through the Armfield swept surface heat exchanger was controlled with an on/off cooler so that the coolant temperature never rose above 85° F.

The in-process butter was discharged from the Armfield swept surface heat exchanger to a stainless steel cooling beaker. The temperature of the in-process butter upon leaving the Armfield swept surface heat exchanger ranged from about 92° F. to about 96° F. The stainless steel cooling beaker was located in a quiescent crystallizing chamber.

The quiescent crystallizing chamber included a double-ply cardboard box that was positioned on a 1¾ inch thick Styrofoam sheet. The Styrofoam sheet was positioned on a counter top in the laboratory. The stainless steel cooling beaker was positioned on the cardboard bottom of the double-ply cardboard box. A double-ply aluminum foil lid was used to cover the open upper end of the stainless steel cooling beaker. The cardboard box was large enough to leave several inches of space between the sides of the beaker and the cardboard box and also between the top of the beaker and the cardboard box. This space between the beaker and the cardboard box defined a dead air space. A temperature probe was positioned in approximately the center of the in-process butter to measure a temperature T-1. A second temperature probe was positioned to measure the dead air space temperature T-2 outside of the stainless steel sample beaker and within the cardboard box.

Figure 2:
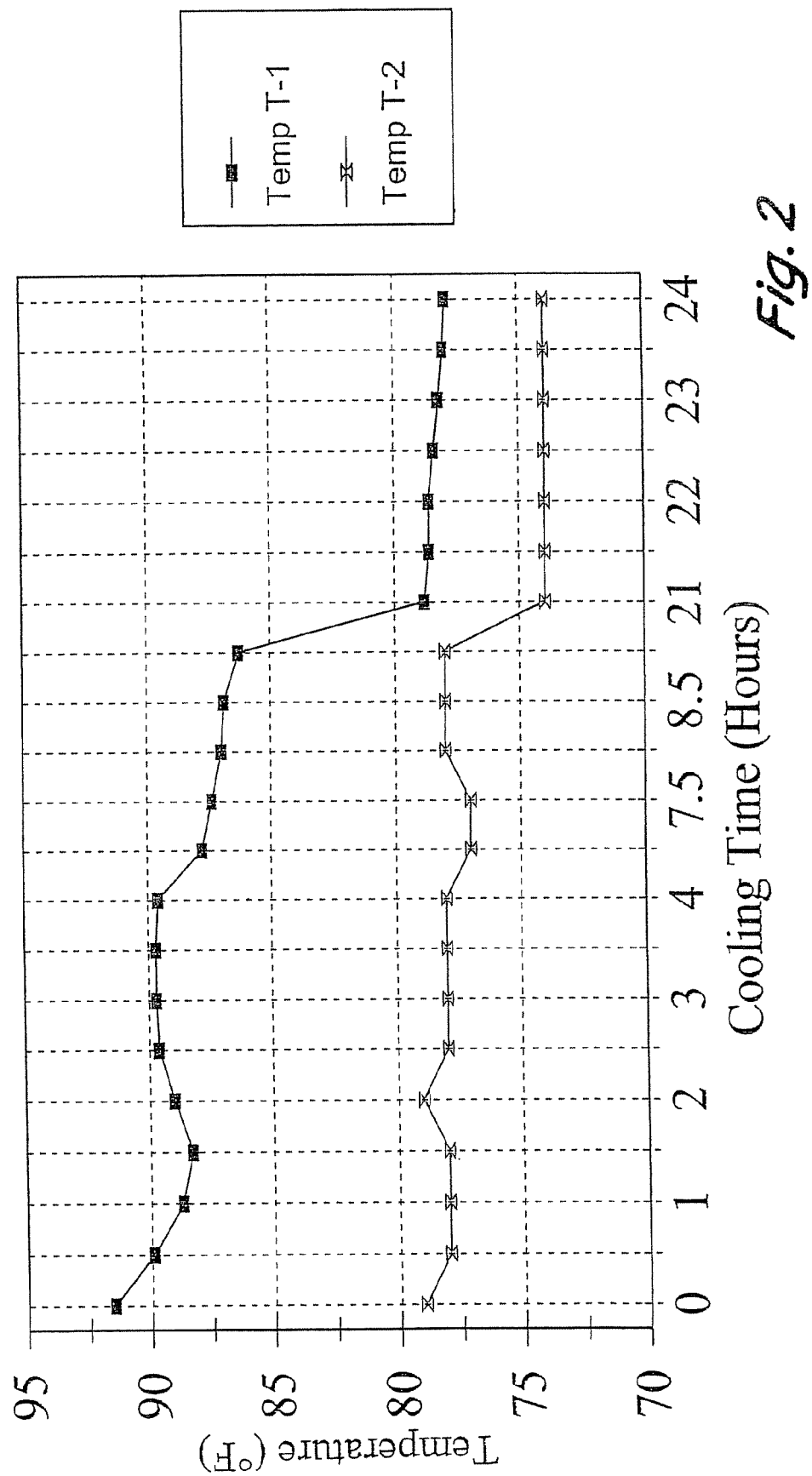
FIG. 2 is a graphical representation from Example 1 of an in-process butter temperature T-1 and a dead air space temperature T-2 over the course of a quiescent cooling period in accordance with the present invention.

The in-process butter was allowed to quiescently cool in the quiescent crystallizing chamber for 24 hours. A plot comparing the in-process butter temperature T-1 to the dead air space temperature T-2 is provided in FIG. 2. The details of FIG. 2 demonstrate that the in-process temperature T-1 started at about 91.5° F. at the start of the 24 hour quiescent cooling period and fell to 77.9° F. at the end of the 24 hour cooling period. Meanwhile, the dead air space temperature T-2 fell from about 79° F. at the start of the quiescent cooling period to about 74° F. at the end of the quiescent cooling period.

Several observations were made during the 24 hour quiescent cooling period. First, large (macro) white crystals were observed at the bottom of the stainless steel cooling beaker and also proximate the side walls of the cooling beaker. Toward the interior of the cooling beaker, proximate "cavity" defined by the large macro white crystals, a considerable amount of liquid material that was believed to be butter oil remained from about the center of the cooling beaker towards the top of the cooling beaker.

A Scott Turbon® laboratory mixer equipped with a Model A mixing head obtained from Scott Turbon® Mixer, Inc., of Adelento, Calif. was positioned with the Model A mixing head located beneath the surface of the in-process butter contained within the stainless steel cooling beaker. The Model A mixing head is a slotted cage type mixing head that is capable of producing high mechanical shear useful for producing stable emulsions and suspensions. The Scott Turbon® mixer was turned on to operate the mixing head at about 1,030 rpm. This mixing head readily dispersed and redistributed the observed large white crystals into the observed liquid butter oil and also easily blended the aqueous phase and the fat phase into a homogeneous matrix. In subsequent portions of this example, the blended material formed in accordance with the details provided in this paragraph is referred to "blended matrix." This blended matrix is comparable to the fat product 24 that is discussed in the detailed description of the invention above.

A control, a sample of the blended matrix, and various forms of the blended matrix that were either further processed and/or combined with other materials were subsequently subjected to penetration testing and/or viscosity testing. For example, Sample A was a control sample that consisted of a sample of the conventional, printed, salted Land O' Lakes butter used as the feed material in this example. Sample B was the blended matrix. Sample C was the sample of the blended matrix that was subsequently homogenized using a lab scale hand pump-type homogenizer. This hand pump homogenizer typically added between about 3° F. and about 5° F. to the temperature of the material that was fed to the hand pump homogenizer.

Next, Sample D consisted of a sample of the blended matrix that had been subjected to homogenization using the hand pump homogenizer and which was thereafter placed in a stainless steel beaker and hand cooled in an ice bath while scraping the sides of the beaker with a stainless steel spatula until the material contained in the beaker was very thick. Additionally, while being hand cooled, the Sample D material was also subjected to agitation using the Caframo RZRI mixer equipped with the three blade agitator. Next, Sample E consisted of the blended matrix that was homogenized using the hand pump homogenizer and was thereafter mechanically worked and cooled using the Armfield FT25B lab scale swept surface heat exchanger. Finally, Sample F was a 50/50 (weight basis) combination of the blended matrix and the conventional printed, salted, Land O' Lakes butter.

Each of Samples A-F were subjected to penetrometer testing to evaluate the consistency of the various samples as the temperature of the sample was raised initially from 37° F. to 65° F., then reduced back to 39° F., and then increased back up to 68° F., over a period of about two months. This long period of evaluation was undertaken so that a relatively long resting period of several weeks was allowed. This relatively long resting period was undertaken to allow an adequate time for any rehardening to occur. One purpose of this example was to evaluate the tendency for any of the various samples based upon the blended matrix, or derivatives thereof, to revert back to a crystal structure and hardness characteristic of butter, since it is known that some softened butters, when given an appropriate amount of time, will actually revert in crystal structure back to a level of hardness characteristic of the original butter.

Figure 3:
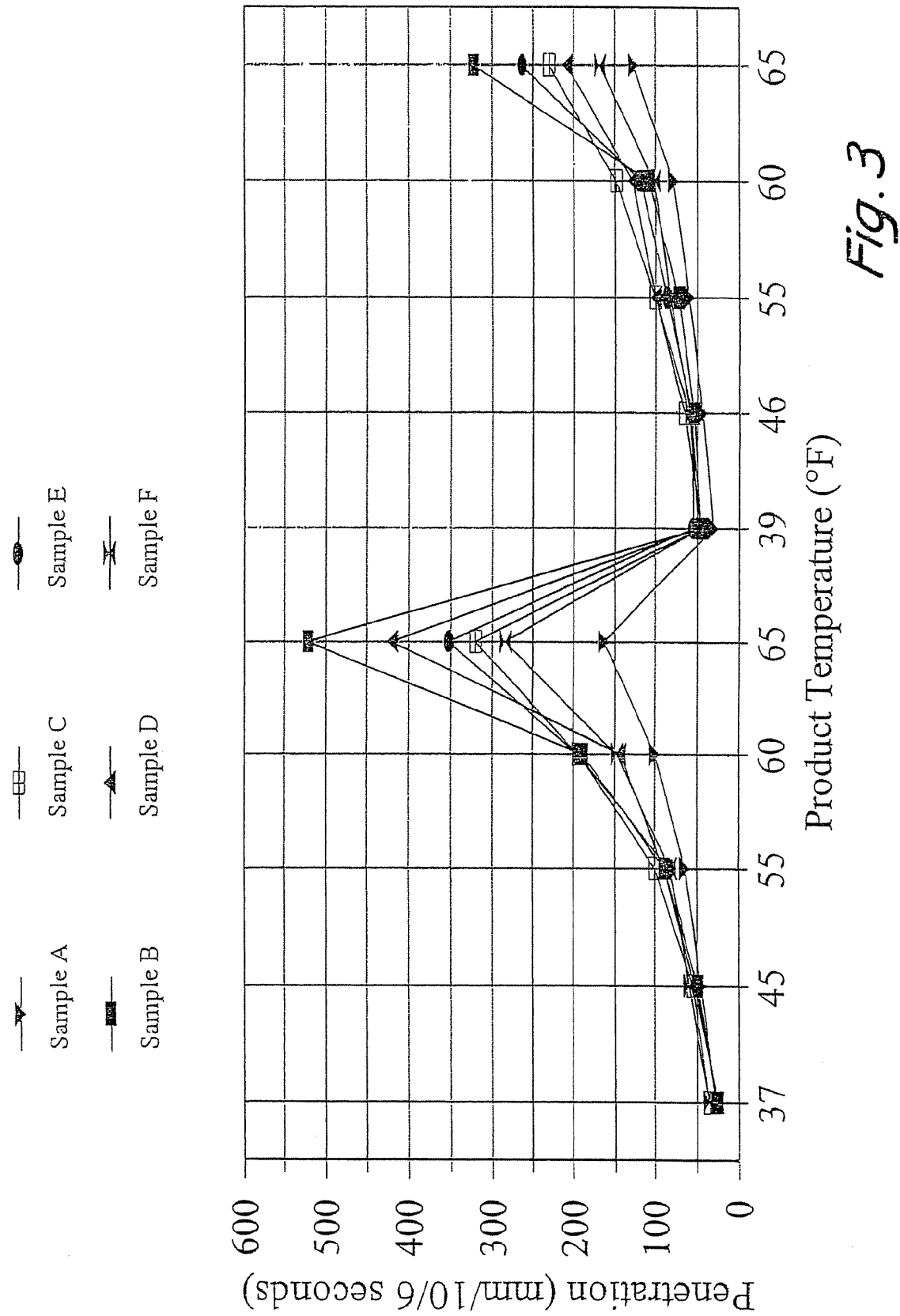
FIG. 3 is a graphical representation of penetrometer testing results from Example 1 as a function of temperature and as a function of repeated cycling from refrigeration temperatures to elevated temperatures for a control sample and for various butter products produced in accordance with the present.

In this example, the Penetrometer testing was conducted in accordance with the Penetrometer Procedure that is provided above in the Property Analysis and Characterization Technique section of this document. The results of this Penetrometer testing are graphically presented in FIG. 3. These results of FIG. 3, as expected show that the butter sample, mainly Sample A had the lowest Penetrometer reading, and therefore was hardest of all the samples, had every sample temperature. Next, Sample F, which was a 50/50 weight combination of the blended matrix of Sample B and butter, was generally harder (lower penetration reading) at all temperatures, though this material of Sample F was somewhat softer and especially at temperatures greater than 60° F., as compared to the control butter of Sample A.

The material of Sample B, which was the blended matrix without further processing, was definitely softer (higher penetrometer reading) than all of the other samples at 65° F., both during the first temperature increase to 65° F. and during the second temperature increase to 65° F. The three samples of the blended matrix that had been homogenized (i.e. Samples C, D, and E), were each somewhat harder than the non-homogenized version of the blended matrix (Sample B), at the first 65° F. testing and at the second 65° F. testing, though these three samples were each softer at these two 65° F. testing conditions than either of the samples that contained any butter not subjected to the softening procedure (Samples A and F). The increased hardness of Samples C, D, and E relative to Sample B, especially at temperatures approaching room temperature, is not unexpected, since the crystal surface area available for liquid oil absorption increased due to the homogenization procedure, which allowed increased liquid oil absorption and consequently caused the specific volume of these three samples to decrease somewhat, relative to the specific volume of Sample B.

Despite the diminished softness observed for Samples C-E, at temperatures approaching room temperature, is acceptable since the homogenization applied to these three samples tends to enhance the stability of the aqueous phase relative to the fat phase in these samples, especially with increasing sample temperature as compared to a non-homogenized from of the blended matrix. On the other hand, Sample B was observed to have an adequate degree of stability at elevated temperatures, while also offering the enhanced softness and pourability at elevated temperatures approaching room temperature. Ultimately, the materials of Samples B-E offer a range of different properties achievable in accordance with the present invention that offer end users a flexible variety of properties to choose from, while in all cases enhancing the softness properties relatively to Samples A and F that each contained at least some butter not subject to the softening procedure in accordance with the present invention.

Next, Sample C, which was a sample of the blended matrix (Sample B) following homogenization using the hand pump homogenizer, was subjected to repeated heating and cooling cycles with penetrometer testing at the cool temperature (37° F.) and with viscosity testing at the warmer 69° F. to 72° F. temperatures. In this testing of Sample C, the penetrometer testing was conducted in accordance with the Penetrometer Procedure as described above in the Property Analysis and Characterization Technique section of this document. Similarly, the viscosity testing of Sample C was conducted in accordance with the Viscosity Procedure that is provided above in the Property Analysis And Characterization Technique section of this document.

The details of this temperature cycling and the resulting penetration and viscosity testing results are provided in Table 1 below:

TABLE 1

| Sample Description | Observations |
| --- | --- |
| Sample C @ initial 37° F. temperature | Penetration reading: 35 mm/10/6 seconds |
| Sample C after warming to 72° F. | Pourable (5600 centipoise) |
| Sample C after cooling back to 37° F. (first heat/cool cycle complete) | Penetration reading: 31 mm/10/6 seconds |
| Sample C after warming back up to 69° F. | Pourable (8800 centipoise) |
| Sample C after cooling back to 37° F. (second heat/cool cycle complete) | Penetration reading: 36 mm/10/6 seconds |
| Sample C after warming back up to 71° F. | Pourable (6400 centipoise) |

These results of Table 1 demonstrate that this material, at each of the three different 37° F. penetrometer readings, was somewhat softer than butter not processed in accordance with the present invention. On the other hand, after being raised to an elevated temperature ranging from about 69° F. to 72° F., Sample C, even after two full temperatures cycles from 37° F. to elevated temperature and back to 37° F., always retained a pourable viscosity. Likewise, the consistent return of Sample C to penetrometer readings within a relatively narrow range at 37° F. demonstrates consistent properties of the Sample C material, even after repeated temperature cycles. Thus, these details of Table 1 demonstrate that the Sample C material retains the fat crystal structure originally produced in accordance with the present invention during repeated temperature cycling, both at refrigeration temperatures on the order about 37° F. and at elevated temperatures ranging from 69° F. to 72° F.

Example 2

In Example 2, identical equipment and similar procedures were followed relative to the butter softening process followed in Example 1, with the exception of modification of the discharge temperature range from the Armfield FT25B scraped surface heat exchanger and modification of the flow rate of the melted butter through the Armfield FT25B scraped surface heat exchanger for one sample produced in this example. Ultimately, in Example 2, as in Example 1, the blended matrix was formed by (1) melting the butter used as the feed material; (2) quickly cooling the melted butter to the first temperature using the Armfield FT25B scraped surface heat exchanger; (3) quiescently cooling the in-process butter discharged from the Armfield FT25B scraped surface heat exchanger to the second temperature in the quiescent crystallizing chamber; and (4) homogeneously blending the quiescently cooled in-process butter to form the blended matrix.

In this example, one sample of the blended matrix was prepared after feeding the melted butter to the Armfield FT25B scraped surface heat exchanger at a feed rate of about 61 grams per 10 seconds and a lowered swept surface heat exchanger discharge temperature (first temperature) of about 82° F. to about 86° F. To attain this lowered first temperature range of about 82° F. to about 86° F., the temperature set point for the cooling medium of the Armfield FT25B scraped surface heat exchanger that triggered activation of the cooling medium cooler was 54.2° F., rather than the 85° F. temperature noted in Example 1. Hereafter, in this example, the blended matrix of this example that was formed based upon the lowered heat exchanger discharge temperature (first temperature) of about 82° F. to about 86° F. is referred to as the "Example 2 blended matrix sample." Also, prior to homogeneous blending in the cooling beaker, the in-process butter that became the Example 2 blended matrix sample is the "Example 2 quiescently cooled butter sample."

Also in this example, a sample of the Example 1 blended matrix was reproduced after using the process details of Example 1 and the higher swept surface heat exchanger discharge temperature (first temperature) of about 92° F. to about 96° F. As in Example 1, the melted butter was fed to the Armfield FT25B scraped surface heat exchanger at a feed rate of about 31 grams per 10 seconds to about 34.5 grams per 10 seconds, and the temperature set point for the cooling medium of the Armfield FT25B scraped surface heat exchanger that triggered activation of the cooling medium cooler was 85° F. when producing the blended matrix that was formed based upon the higher heat exchanger discharge temperature (first temperature) of Example 1 about 82° F. to about 86° F. Hereafter, in this example, the blended matrix of this example that was formed based upon the higher heat exchanger discharge temperature (first temperature) of about 92° F. to about 96° F. is referred to as the "Example 1 blended matrix sample." Also, prior to homogeneous blending in the cooling beaker, the in-process butter that became the Example 1 blended matrix sample is the "Example 1 quiescently cooled butter sample."

Prior to homogeneous blending, the Example 1 quiescently cooled butter sample that was based upon the higher heat exchanger discharge temperature (first temperature) of about 92° F. to about 96° F. exhibited the same general characteristics as the comparable sample described in Example 1, namely several inches of free oil on the surface with a soft cake of fat crystals about the perimeter and bottom of the cooling beaker. On the other hand, prior to homogeneous blending, the Example 2 quiescently cooled butter sample that was based upon the lower heat exchanger discharge temperature (first temperature) of about 82° F. to about 86° F. was completely set up as a semi-solid, though soft, with no free oil remaining. It was noted that the Example 2 quiescently cooled butter sample that was based upon the lower heat exchanger discharge temperature (first temperature) of about 82° F. to about 86° F. did not look easily blendable.

After these observations were noted, both the Example 1 blended matrix sample and the Example 2 blended matrix sample were formed by blending the Example 1 quiescently cooled butter sample and the Example 2 quiescently cooled butter sample, respectively, in accordance with the blending procedures described in Example 1 for producing the blended matrix following the 24 hour quiescent cooling period. It was observed that blending of the Example 1 quiescently cooled butter sample to form the Example 1 blended matrix sample was very easy since the material easily blended into a homogeneous mixture, was very liquid, and turned over very well. Though the Example 2 quiescently cooled butter sample material was entirely semi-solid, though soft, and did not look like it would easily blend, this material nevertheless became very fluid and blended very smoothly upon actuation of the mixer to form the Example 2 blended matrix sample.

Next, various samples were prepared for use in comparative testing. First, a control sample of the butter used as the feed material in Examples 1 and 2, was designated as Sample A. Next, Sample B consisted of the Example 1 blended matrix sample that was produced in this Example 2. Sample C consisted of a homogenized form of the Example 1 blended matrix sample produced in this Example 2; Sample C was homogenized using the hand pump homogenizer described in Example 1. Next, Sample D was the Example 2 blended matrix sample produced in this Example 2. Finally, Sample E was a homogenized form of the Example 2 blended matrix produced in this Example 2; Sample E was homogenized, like Sample C, using the hand pump homogenizer described in Example 1.

These five samples (Samples A-E) were each subjected to penetrometer testing at temperatures ranging from 39.5° F. to 65° F. This penetrometer testing was conducted in accordance with the Penetrometer Procedure that is described above in the Property Analysis and Characterization Technique section of this document. The penetrometer readings for these five different samples over the 39.5° F. to 65° F. temperature range are graphically depicted in FIG. 4.

Figure 4:
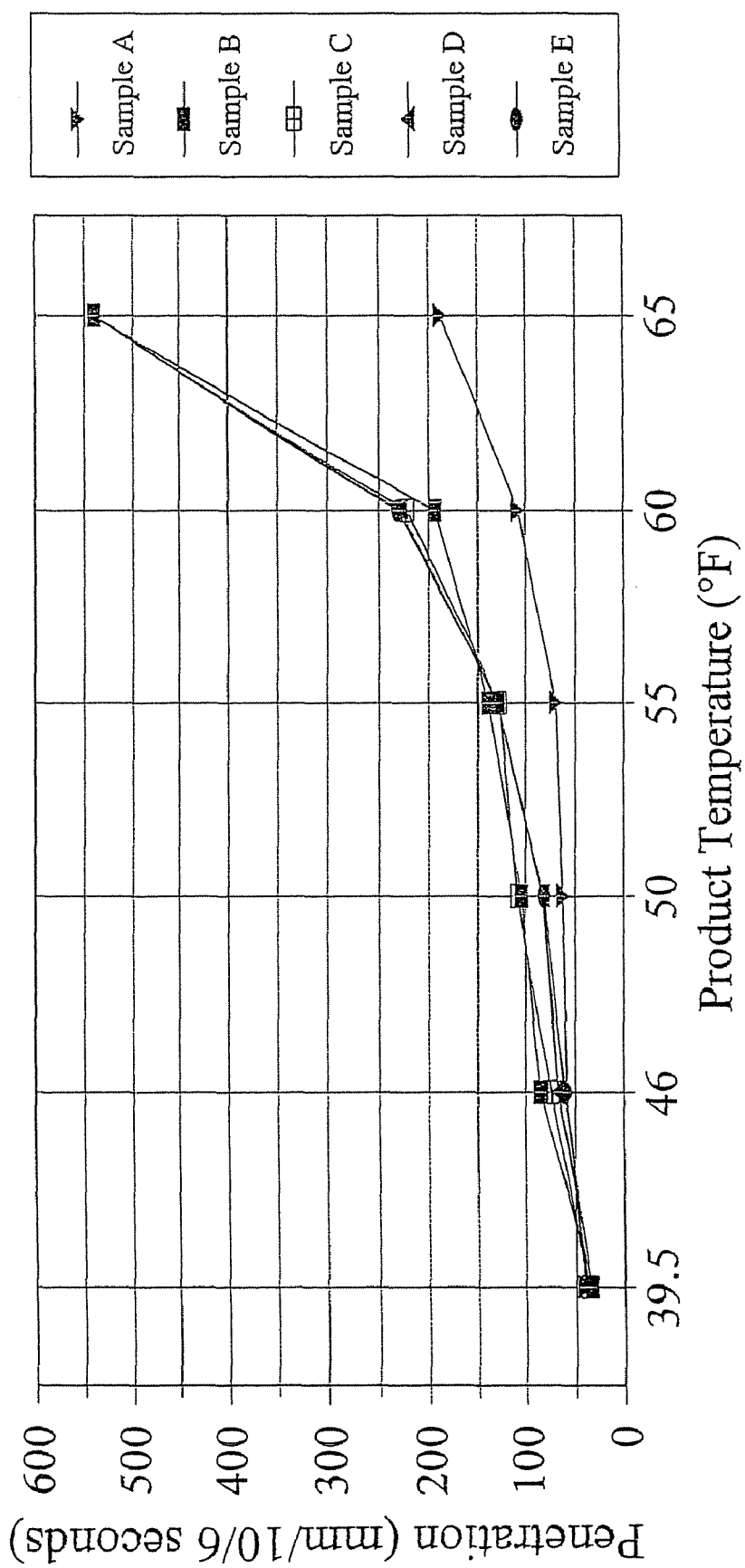
FIG. 4 is a graphical representation of penetrometer testing results from Example 2 as a function of temperature for a control sample and for various butter products produced in accordance with the present.

In FIG. 4, each of the depicted readings for the different samples at the different temperatures are averages of two readings for the particular sample taken at the particular temperature. Also, the penetrometer readings at 65° F. for Samples B-E represent the maximum penetrometer reading that could be taken on the penetrometer and do not necessarily reflect the actual penetrometer value for these four samples. Due to this limitation of the penetrometer readings, the next scheduled penetrometer readings at a 72° F. were changed to a viscosity determination for Samples B-E, while a penetrometer reading of 237 millimeters/10/6 seconds (23.7 mm per six seconds) was obtained at 72° F. for Sample A. The viscosities that were determined for Samples B-E at the 72° F. sample temperature were 1,200 centipoise for Sample B; 3,400 centipoise for Sample C; 53,000 centipoise for Sample D; and 45,500 centipoise for Sample E.

The viscosities of Samples B-E at 72° F. sample temperature were determined in accordance with the Viscosity Procedure provided above in the Property Analysis and Characterization Technique section of this document, with a couple of exceptions. Specifically, the viscosity determination for Sample D was made with the RV spindle # 4 operating at 2 rpm, while the viscosity determination for Sample E was made with the RV spindle # 4 operating at 4 rpm. As stated in the Viscosity Procedure described in the Property Analysis and Characterization Technique section of this document, RV spindle # 4 was operated at 10 rpm for both the Sample B and Sample C viscosity determinations at the 72° F. sample temperature.

The results depicted in FIG. 4 demonstrate that all of the Sample B-E butter products (i.e. softened butter) produced in this example were softer than the control butter of Sample A at temperatures above refrigeration temperature, especially as at temperatures of 55° F. and higher. Additionally, the viscosity determined for Samples B-E that ranged from 1,200 centipoise to 53,000 centipoise at the 72° F. sample temperature were all pourable butter products, as compared to the control butter of Sample A, at 72° F., merely being softened. These viscosity results also demonstrate a surprising difference in viscosity characteristics for butter products produced in accordance with the present invention, depending upon whether the end point (first temperature) for the initial cooling, such as the cooling in the swept surface heat exchanger, ranges from about 92° F. to about 96° F., versus ranging from about 82° F. to about 86° F.

For example, Samples D and E that had viscosities at 72° F. of 53,000 centipoise and 45,500 centipoise, respectively, were each based upon end point (first temperature) for the initial cooling being about 82° F. to about 86° F. On the other hand, Samples B and C that had viscosities at 72° F. of 1,200 centipoise and 3,400 centipoise, respectively, were each based upon the end point (first temperature) for the initial cooling being about 92° F. to about 96° F. Thus, this Example 2 surprisingly demonstrates that changes in the end point (first temperature) for the initial cooling, prior to quiescent cooling, have a profound effect on the viscosities of the final product (blended matrix and derivatives thereof) at elevated temperatures on the order of about 72° F. This further demonstrates the flexibility of the present invention for producing softened butter products with different desired characteristics, such as different viscosities at elevated temperatures.

Finally, some generalized observations about the visual appearances of Samples B-E are provided. Sample B visibly had a relatively large crystal structure and a resulting grainy appearance, while Sample C, which was a homogenized form of Sample B, had a relatively smooth appearance with a visibly smaller crystal structure. As demonstrated by the viscosities of Samples B and C at 72° F., both Sample B and Sample C had a very pourable viscosity at room temperature, namely 72° F.

Next, Sample D was observed to have a relatively large crystal structure with a resulting semi-grainy appearance. On the other hand, Sample E, which was the homogenized form of Sample D, had a visibly smaller crystal structure and resulting smoother appearance, as compared to Sample D. The much higher viscosities of Sample D and Sample E at 72° F., as compared to the relatively low viscosities of Sample B and Sample C at 72° F., caused both Samples D and E to be flowable, but almost semi-solid in consistency.

These observations about Samples B-E demonstrate that the homogenized forms of Sample B and Sample D, namely Samples C and Sample E, respectively, had a smoother appearance that would likely be more acceptable to consumers. Also, these homogenized forms of Sample B and Sample D, namely Samples C and Sample E, respectively, due to their greater homogeneity, tend to be less likely to show any free oil at the surface, especially at increasing temperatures even greater than room temperature. One final observation is that end points (first temperatures) for the initial cooling that were somewhat elevated (i.e. about 92° F. to about 96° F.), as compared to somewhat lower points (first temperatures) for the initial cooling (i.e. about 82° F. to about 86° F.), produced a much more flowable and pourable product at room temperature conditions of about 72° F.

Example 3

This example demonstrates the results of a pilot plant trial for producing butter product that is pourable at elevated temperatures using larger scale equipment, rather than the laboratory scale equipment used in Examples 1 and 2. In this example, the feed material was the conventional printed, salted, Land O'Lakes butter similar to that used in Examples 1 and 2. In this example, the butter that was used as the feed material was produced about five days prior to being used as the feed material in this pilot plant trial of Example 3.

In this example, a Model PCP processing tank available from Paul Mueller Company of Springfield, Mo. was used as the melt tank. This melt tank was equipped with a center post agitator and agitation enhancement baffles that were attached to the inside perimeter wall of the tank. The butter that was used as the feed material was added to the melt tank and heated to melt the butter and give the melted butter a temperature of about 150° F. Thereafter, the melted butter was cooled to a temperature ranging from about 136° F. to about 140° F. A pair of Votator® swept surface heat exchangers were positioned in series. These Votator® swept surface heat exchangers were obtained from Waukesha Cherry-Burrell of Delavan, Wis. Conventional R-12 refrigerant was used as a coolant in the first of the swept surface heat exchangers, while no coolant was employed in the second of the swept surface heat exchangers.

A Moyno® Model G3 SSE positive displacement pump was employed to pump the melted butter to the first swept surface heat exchanger. The material temperature at the exit from the first swept surface heat exchanger was set to be about 92° F. As noted, the second swept surface heat exchanger was not cooled. Therefore, the material temperature at the exit from the second swept surface heat exchanger was observed to rise somewhat, to about 98° F., due to the energy imparted to the material as the material was worked in the second swept surface heat exchanger.

Another model PCP tank with a 50 gallon capacity from Paul Mueller Company was used as the quiescent cooling vessel that accepted the material discharged from the second swept surface heat exchanger. This 50 gallon capacity quiescent cooling vessel included a center post agitator with agitation enhancement baffles attached to the inside peripheral wall of the tank. The quiescent cooling tank included a temperature probe for measuring an in-process butter temperature T-3 that was oriented to be several inches below the fluid surface upon filling of the tank. This quiescent cooling vessel was fully covered and included another temperature probe located outside of the tank to measure the ambient air temperature (temperature T-4) outside of the tank over the course of the quiescent cooling period.

The Moyno® pump was used to transfer the melted butter from the 100 gallon melt tank to the first swept surface heat exchanger at a rate of about 10.4 pounds per minute. The temperature of the material exiting the first swept surface heat exchanger was about 92° F. Again, the second swept surface heat exchanger was not employed in a cooling mode. Therefore, the material exiting the second swept surface heat exchanger had a temperature of about 98° F., prior to being placed in the 50 gallon quiescent cooling vessel. The Moyno® pump provided the melted butter to the first swept surface heat exchanger at a rate of about 10.4 pounds per minute. The material exiting the second swept surface heat exchanger was observed to have the appearance of melted butter.

Figure 5:
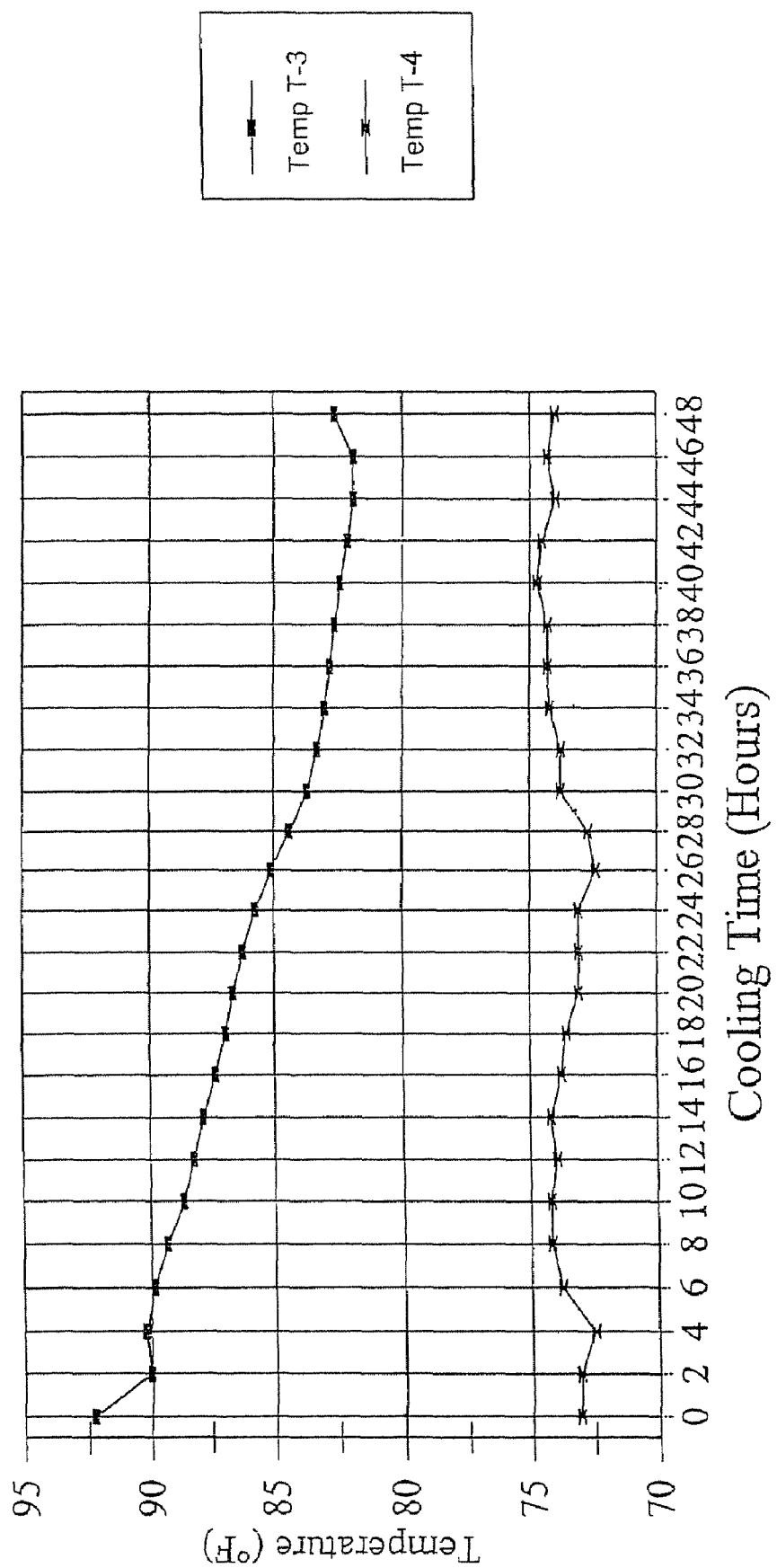
FIG. 5 is a graphical representation from Example 3 of an in-process butter temperature T-3 and an ambient air temperature T-4 over the course of a quiescent cooling period in accordance with the present invention.

After being placed in the 50 gallon quiescent cooling vessel, the in-process butter was allowed to cool under quiescent conditions without any agitation for 48 hours. During this 48 hour quiescent cooling period, the T-3 temperature of the in-process butter and the ambient air temperature T-4 outside of the quiescent cooling vessel were each measured and logged every two hours. A plot of these two temperatures T-3 and T-4 is provided in FIG. 5. This plot of FIG. 5 shows that the in-process butter temperature T-3 gradually decreased over the 48 hour quiescent cooling period from about 92.2° F. to about 82° F. The overall rate of temperature decrease of the in-process butter during the quiescent cooling period was observed to be somewhat faster in Examples 1 and 2, versus this Example 3. This is believed to be due, at least in part, to the smaller batch sizes used in Examples 1 and 2 versus the significantly larger batch size used in this Example 3. Nonetheless, even the slower quiescent cooling rate of Example 3 produced acceptable butter product in accordance with the present invention.

At this point, after the 48 hour quiescent cooling period, but prior to any blending, samples of the fat crystals were removed from the quiescently-cooled in-process butter using a stainless steel spathula that was at approximately room temperature. The fat crystals were then suspended in Resolve® high viscosity microscope immersion oil that is available from Criterion Sciences, a division of Cornwell Corporation, of Riverdale, N.J. The Resolve® high viscosity immersion oil has a room temperature (about 72° F.) viscosity of about 1,250 centipoise, has an index of refraction of about 1.5150, and is a proprietary blend of synthetic hydrocarbons and advanced polymers that allows the immersion oil to be a stable, non-drying, non-hardening fluid.

The combination of the fat crystals and microscope immersion oil was placed on a glass slide and then covered with a glass cover slip. The fat crystals in the immersion oil were then viewed through a microscope with a power of 1,000× magnification. When viewed in this way, the fat crystals, with no aqueous phase present, appeared as long strands with a centrally fixed nuclei. Most of the fat crystals had a diameter of about 90 microns and may thus be characterized as macro fat crystals. Thus, the fat crystals of the in-process butter that had been quiescently cooled, but not yet blended with the remaining portions of the in-process butter, had a structure under the microscope that was based upon long centrally fixed strands, as one would expect from the grainy appearance of the fat phase, when viewed with the naked eye.

After the 48 hour quiescent cooling period had ended, the center post agitator was activated to operate at a rate of about 40 rpm to homogeneously mix the quiescently cooled in-process butter and form the blended matrix (referred to as the butter product in the Detailed Description above). This agitation was observed to readily turn over, and homogeneously mix, the quiescently cooled in-process butter. After the mixing was completed, no visible free oil was observed in the blended matrix. Following mixing, the crystal structure of the blended matrix was observed to have a grainy appearance, as in Examples 1 and 2.

The blended matrix (butter product) was then removed from the 50 gallon quiescent cooling tank and homogenized in a two speed, two stage APV Gaulin homogenizer that may be obtained from APV Gaulin International SA of Hilversum, the Netherlands. The APV Gaulin homogenizer had a first stage pressure on the order of about 500-600 pound per square inch (psi), and a flow rate of about two gallons per minute. Only the first stage of the two stages of the homogenizer were used to homogenize the blended matrix and form the homogenized blended matrix (also referred to in this Example as the "homogenized butter product").

The blended matrix (butter product) was carried in buckets from the 50 gallon quiescent cooling tank and placed in the feed funnel of the homogenizer. The blended matrix, at the time of being placed in the feed funnel, had a temperature of about 79.8° F. and a coarse, grainy appearance. The homogenized butter product, upon discharge from the homogenizer, had a temperature of about 83.6° F. and a smooth, creamy appearance. The homogenized butter product was then packed in eight pound batches in plastic pails. The pails containing the eight pound batches were placed in a walk-in cooler with a temperature of about 39° F. to allow the batches to cool to refrigerated temperature.

A couple of samples of the homogenized butter product were obtained prior to placing the batches of the homogenized butter product in the walk-in cooler. One sample of the homogenized butter product was suspended in a quantity of the aforementioned Resolve® microscope immersion oil. The sample of the homogenized butter product suspended in the microscope immersion oil was placed on a glass slide, covered with a glass cover slip, and then viewed under a microscope with a power of 1,000× magnification. This sample of the homogenized butter product, when viewed under the microscope, showed that the macro-fat crystal structure previously observed in the quiescently-cooled in-process butter (diameter of about 90 microns) had been diminished in size somewhat to have shorter strands with less uniform strand centering and fat crystal diameters generally ranging from about 10 to about 20 microns in diameter. Additionally, some globules of fat crystals were observed. These globules of fat crystals contained entrained aqueous phase material. The aqueous phase material that was entrained in the globules of fat crystals generally had a droplet diameter ranging from about 1 to about 2 microns.

Additionally, another of the samples of the homogenized butter product obtained prior to refrigeration of the buckets was assessed for viscosity using the Viscosity Procedure described above in the Property Analysis and Characterization Technique section of this document. The RV spindle # 4 was operated at about 10 rpm during the viscosity determinations. At a sample temperature of about 78° F., the homogenized butter product was observed to have a Brookfield viscosity of about 8,700 centipoise.

One of the buckets containing an eight pound sample of the homogenized butter product, where the homogenized butter product in the bucket had cooled to about 39° F. in the walk-in cooler, was subjected to penetration testing using the Penetrometer Procedure described above in the Property Analysis and Characterization Technique section of this document. A temperature probe was inserted about an inch into the cooled homogenized butter product at a distance about 1½ inches inward from the perimeter of the bucket. The location of this temperature probe was not changed during the penetrometer testing. Pairs of penetrometer determinations were taken at six different homogenized butter product temperatures (41° F., 46.2° F., 51.9° F., 54.8° F., 57.5° F., and 65.6° F.) at six different penetrometer determination stations (one station per determination temperature) that were approximately equally spaced apart from each other about the perimeter of the butter in the tub, as the homogenized butter product gradually warmed under room temperature ambient conditions over a period of about 22 hours.

Each penetrometer determination station was spaced about 1.5 inches inward from the peripheral bucket wall. Each penetrometer determination at each different homogenized butter product temperature (i.e. at each different penetrometer determination station) was identified as either Sample 1 or Sample 2. Thus, six Sample 1 penetrometer determinations were made at each homogenized butter product temperature, and six Sample 2 penetrometer determinations were made at each homogenized butter product temperature. These Sample 1 and Sample 2 penetrometer determinations are graphically depicted in FIG. 6.

Figure 6:
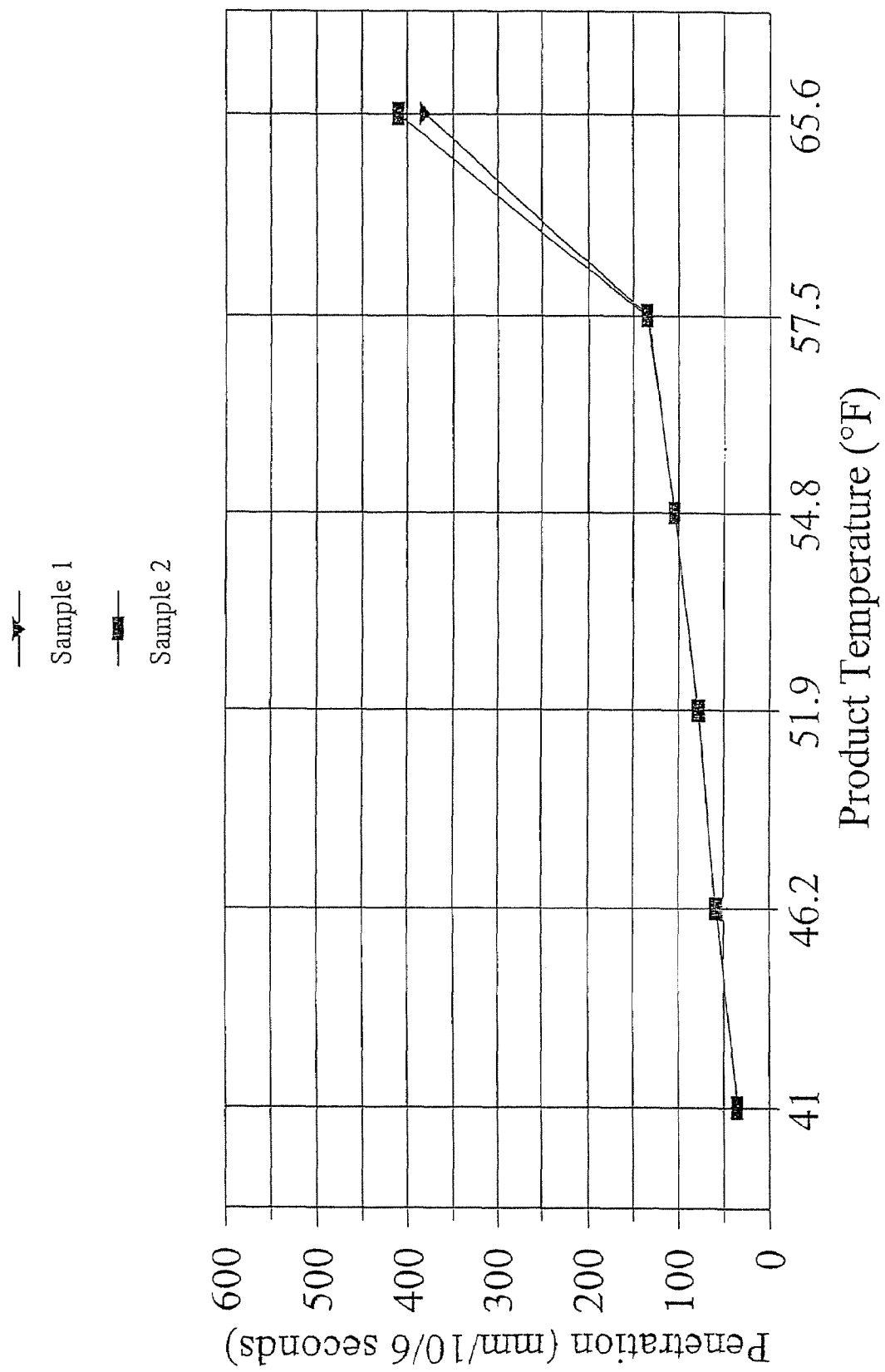
FIG. 6 is a graphical representation of penetrometer testing results from Example 3 as a function of temperature for a control sample and for various butter products produced in accordance with the present.

The Sample 1 and Sample 2 penetrometer determinations depicted in FIG. 6 demonstrate that the pairs of penetrometer determinations at each homogenized butter product temperature had values that were the same, or were very close to each other, at each of the different homogenized butter product temperatures, with the Sample 1 and Sample 2 determinations showing the greatest variation at the 65.6° F. homogenized butter product temperature. Additionally, from FIG. 6, it can be seen that the homogenized butter product gradually softened at approximately a linear rate from 41° F. to 57.5° F., but then softened at a significantly higher rate when going from 57.5° F. to 65.6° F. This observation correlates well with the data depicted in both FIGS. 3 and 4 for homogenized butter product samples, at least with respect to the greater penetrometer reading slope when moving from about 60° F. to about 65° F.

Next, a gravity convection incubator was obtained from GCA Corporation of Bedford, Mass. The temperature within the incubator was maintained at about 72° F. to about 73° F. A sample of the cooled homogenized butter product was obtained from one of the eight pound buckets in the walk-in cooler and was placed in a covered holding container within the convection incubator. The temperature of the sample of cooled homogenized butter product was allowed to reach a temperature of about 72° F. in the incubator. The viscosity of this warmed homogenized butter product was then determined in accordance with the Viscosity Procedure provided above in the Property Analysis and Characterization Technique section of this document, with the exception that the RV spindle # 4 was operated at 4 rpm, rather than 10 rpm. The RV spindle # 4 was operated at a lower rate to accommodate the relatively thick form of the warmed homogenized butter product.

The warmed butter product was determined to have a Brookfield viscosity of about 23,000 centipoise at the 72° F. temperature of the warmed homogenized butter product. The warmed homogenized butter product, at the 72° F. temperature, was observed to be smooth and pourable and also had a pleasant flavor of butter. This 23,000 centipoise viscosity level for the 72° F. warmed homogenized butter product was unexpectedly somewhat higher than the viscosity (ranging from about 5,600 centipoise to about 8,800 centipoise at measurement temperatures ranging from about 69° F. to about 72° F.) for comparable Sample C from Example 1, which was also homogenized butter product. The somewhat thicker Brookfield viscosity of this Example 3 warmed homogenized butter product was surprising, since the first temperature to which the melted butter was initially cooled was about 98° F. in this example, which is fairly similar to the first temperature of about 92° F. to about 96° F. that was employed when preparing the homogenized butter product of Sample C of Example 1.

This variation in Brookfield viscosities observed between this Example 3 warmed homogenized butter product and the Sample C warmed homogenized butter product of Example 1 when using different, but relatively close temperatures as the first temperature to which the melted butter is cooled is thought to possibly be attributable to either the somewhat higher quiescent cooling end point (second temperature) of about 82° F. that existed in Example 3 (versus the quiescent cooling end point (second temperature) of about 78° F. of Example 1) or to the somewhat slower overall cooling rate during the quiescent cooling of Example 3, versus the somewhat higher quiescent cooling rate observed in Example 1. Nonetheless, as indicated above, the homogenized butter product of Example 3 was pourable, though somewhat thicker than originally expected, so that the butter product of the present invention produced in this Example 3 merely represents another suitable variation in viscosity characteristics for pourable butter products produced in accordance with the present invention.

Although the present invention has been described with reference to preferred embodiments, workers skilled in the art will recognize that changes may be made in form and detail without departing from the spirit and scope of the invention.

The invention claimed is:

1. A method of forming a butter product, the method comprising:
   melting butter;
   rapidly cooling the melted butter for a first period of time to a first temperature of from about 92° F. to about 96° F. to form an intermediate; and
   quiescently cooling the intermediate without agitation or mixing for a second period of time that is longer than the first period to a second temperature that is at least about 8° F. cooler than the first temperature to form the butter product, the butter product having a pourable consistency at a temperature of about 72° F.

2. The method of claim 1 wherein the butter is formed via churning.

3. The method of claim 1 wherein the butter and the butter product have different crystal structures.

4. The method of claim 1 wherein quiescently cooling the intermediate entails cooling the intermediate from the first temperature to the second temperature over a period of at least about 12 hours.

5. The method of claim 4 wherein the second temperature ranges from about 72° F. to about 84° F.

6. The method of claim 4 wherein the period is at least about 18 hours.

7. The method of claim 1 wherein the composition of the butter product is at least essentially the same as the composition of the butter.

8. The method of claim 1, the method further comprising homogeneously mixing the butter product.

9. The method of claim 1, the method further comprising homogenizing the butter product.

10. The method of claim 1, wherein the butter product, at a butter product temperature of about 72° F., has a Brookfield viscosity that ranges from about 1000 centipoise to about 55000 centipoise.

11. The method of claim 1 wherein the butter product, at a butter product temperature of about 72° F., is pourable, after the butter product temperature is cycled from about 72° F. to about 37° F. and back to about 72° F. at least twice.

12. The method of claim 1 wherein the butter product, at a butter product temperature of about 72° F., is pourable, after the butter product temperature is cycled from about 72° F. to about 37° F. and back to about 72° F. at least ten times.

13. The method of claim 1 wherein the butter product, at an elevated butter product temperature ranging from about 72° F. to about 92° F., remains homogeneous in the absence of mixing, after the temperature of the butter product is cycled from the elevated butter product temperature to about 37° F. and back to the butter product temperature at least twice.

14. The method of claim 1 wherein the butter product, at an elevated butter product temperature ranging from about 72° F. to about 92° F., remains homogeneous in the absence of mixing, after the temperature of the butter product is cycled from the elevated butter product temperature to about 37° F. and back to the butter product temperature at least ten times.

15. A method of forming a butter product, the method comprising:
   heating butter to form melted butter, the melted butter comprising molten butterfat, the molten butterfat free of any memory of crystallization present in the butterfat prior to melting;
   rapidly cooling the melted butter to a first temperature of about 96° F., or less, to form an intermediate comprising nascent seed crystals; and
   quiescently cooling without agitation or mixing the intermediate to form the butter product.

16. The method of claim 15 wherein quiescently cooling the intermediate entails cooling the intermediate from the first temperature to a second temperature over a period of at least about 12 hours, where the second temperature is at least about 8° F. cooler than the first temperature.

17. The method of claim 16 wherein the second temperature ranges from about 72° F. to about 84° F.

18. The method of claim 16 wherein the period is at least about 18 hours.

19. The method of claim 15 wherein the butter product, at a butter product temperature of about 72° F., has a Brookfield viscosity that ranges from about 1000 centipoise to about 55000 centipoise.

20. The method of claim 15 wherein the butter product, at a butter product temperature of about 72° F., is pourable, after the butter product temperature is cycled from about 72° F. to about 37° F. and back to about 72° F. at least twice.

21. The method of claim 15 wherein the butter product, at a butter product temperature of about 72° F., is pourable, after the butter product temperature is cycled from about 72° F. to about 37° F. and back to about 72° F. at least ten times.

22. The method of claim 15 wherein the butter product, at an elevated butter product temperature ranging from about 72° F. to about 92° F., remains homogeneous in the absence of mixing, after the temperature of the butter product is cycled from the elevated butter product temperature to about 37° F. and back to the butter product temperature at least twice.

23. The method of claim 15 wherein the butter product, at an elevated butter product temperature ranging from about 72° F. to about 92° F., remains homogeneous in the absence of mixing, after the temperature of the butter product is cycled from the elevated butter product temperature to about 37° F. and back to the butter product temperature at least ten times.

24. The method of claim 1 wherein melting butter comprises melting churned butter.

25. The method of claim 1 wherein the first period of time is 60 seconds or less.

* * * * *

UNITED STATES PATENT AND TRADEMARK OFFICE
CERTIFICATE OF CORRECTION

Page 1 of 1

PATENT NO. : 8,329,245 B2
APPLICATION NO. : 12/533716
DATED : December 11, 2012
INVENTOR(S) : Landon It is certified that error appears in the above-identified patent and that said Letters Patent is hereby corrected as shown below:

SPECIFICATION

| Column | Line | PTO | Should Read |
|---|---|---|---|
| 1 | 36 | "For example, the barrel chum made" | --For example, the barrel churn made-- |

Signed and Sealed this
Sixteenth Day of April, 2013

Teresa Stanek Rea
*Acting Director of the United States Patent and Trademark Office*